(12) United States Patent
Sirigireddy et al.

(10) Patent No.: US 10,423,618 B2
(45) Date of Patent: Sep. 24, 2019

(54) METHOD AND SYSTEM FOR ENFORCING USER POLICY ON DATABASE RECORDS

(71) Applicant: Tata Consultancy Services Limited, Mumbai (IN)

(72) Inventors: Gangadhara Reddy Sirigireddy, Pune (IN); Kumar Mansukhlal Vidhani, Pune (IN); Akhil Anand Dixit, Pune (IN); Vijayanand Mahadeo Banahatti, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 170 days.

(21) Appl. No.: 15/629,404

(22) Filed: Jun. 21, 2017

(65) Prior Publication Data

US 2017/0364555 A1   Dec. 21, 2017

(30) Foreign Application Priority Data

Jun. 21, 2016   (IN) .............................. 201621021244

(51) Int. Cl.
*G06F 7/00* (2006.01)
*G06F 17/30* (2006.01)
*G06F 16/2453* (2019.01)
*G06F 21/62* (2013.01)
*G06F 16/2455* (2019.01)
*G06F 16/2457* (2019.01)

(52) U.S. Cl.
CPC .... *G06F 16/24534* (2019.01); *G06F 16/2457* (2019.01); *G06F 16/24553* (2019.01); *G06F 16/24575* (2019.01); *G06F 21/6218* (2013.01); *G06F 21/6227* (2013.01)

(58) Field of Classification Search
CPC ......... G06F 16/24534; G06F 16/24553; G06F 16/24575; G06F 16/2457; G06F 21/6218; G06F 21/6227
See application file for complete search history.

(56) References Cited

U.S. PATENT DOCUMENTS

| 7,587,368 | B2 | 9/2009 | Felsher |
| 9,032,544 | B2 | 5/2015 | Shelton |
| 2009/0254392 | A1 | 10/2009 | Zander |
| 2009/0300002 | A1* | 12/2009 | Thomas ............... G06F 21/6227 |

(Continued)

*Primary Examiner* — Azam M Cheema
(74) *Attorney, Agent, or Firm* — Finnegan, Henderson, Farabow, Garrett & Dunner LLP

(57) ABSTRACT

A system and method are provided for enforcing user policies on database. In one aspect a user policy and/or enterprise policy is predefined and mapped to the column of the database. Further, the query is run through a query parsing module, the result is sent to a query analyzing module to analyze the sensitivity of each query. A query rewriting module rewrites the query and the rewritten query is sent to the database. A sensitive tree is generated using database metadata, which is used during query analysis and query re-writing. In cases the original query does not contain any set operators the rewritten query is executed on the database and results are displayed as per the user policy. The cases where the original query comprises set operators a function called merger is implemented in the database or at the proxy server and data is displayed as per the user policy.

12 Claims, 9 Drawing Sheets

(56) References Cited

U.S. PATENT DOCUMENTS

| | | | |
|---|---|---|---|
| 2010/0228783 A1* | 9/2010 | Castellanos | G06F 11/3672 707/797 |
| 2013/0117313 A1* | 5/2013 | Miao | G06F 21/6227 707/781 |
| 2017/0083604 A1 | 3/2017 | Syed-Ebrahim et al. | |

* cited by examiner

Fig. 4

METHOD AND SYSTEM FOR ENFORCING USER POLICY ON DATABASE RECORDS

PRIORITY CLAIM

This U.S. patent application claims priority under 35 U.S.C. § 119 to India Application No. 201621021244, filed on Jun. 21, 2016. The entire contents of the aforementioned application are incorporated herein by reference.

TECHNICAL FIELD

The present disclosure in general relates to a field of a database access and sensitive data management. More particularly, the present disclosure relates to system(s) and method(s) for enforcing user policy to control access of sensitive data stored in a database.

BACKGROUND

Employees of an enterprise fetch data from production databases (or database) for various purposes such as to resolve customer complaints, fix bugs in an application, etc. The fetched data may contain the sensitive data such as Account Number, SSN, Date of birth, etc. along with non-sensitive data. Data fetched from the enterprise database should not be exposed to anyone without asking consent or notifying concerned persons.

The result of query may not explicitly fetch the data subjects in the result as it's up to the employee to write query according to his requirement. In the absence of information about data subject identifiers, it is not possible to notify them about their sensitive data exposure to enterprise employees. Moreover, data subjects need to be notified only if a query fetches the data being deemed sensitive by regulations or policies (by enterprise or data subjects).

Enterprise employees fire queries against database to fetch data for resolving tickets. Sometimes employees fetch sensitive data along with non-sensitive data. Without data subject approval, sensitive data should not be exposed to employees. With SQL query formation flexibility, employee can write a query in any form. The result of that query may not contain data subject identifiers. In the absence of data subject identifier, it is impossible to notify them when their data has been fetched.

Therefore, the objective is to fetch data subject identifier by re-writing a query with minimum cost.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present application provides a system and method for enforcing user policy to control access of sensitive data stored in a database.

In one embodiment, the present disclosure provides a system for enforcing user policy to control access of sensitive data stored in a database. In one aspect a user policy and/or enterprise policy is predefined and mapped to the column of the database. A query is received from user at a receiving module of the system. Further, the query is run through a query parsing module, the result of the query parsing module is sent to a query analyzing module to analyze the sensitivity of the query. Further, a preference manager module manages the preferences of data subjects. These preferences are access preferences and set on the sensitive fields. A sensitive tree generator module is configured to generate a tree from the metadata of the database. The sensitive tree generator module takes privacy preferences as input to determine the sensitivity of fields which will be subsequently used in marking (with sensitivity) tree nodes. Further, the system comprises a query re-writing module to re-write or modify the query and the rewritten or substituted query is sent to the database. The sensitive tree which is based on database metadata is used during query analysis and query re-writing. In cases the original query does not contain set operators the rewritten query is executed on the database and results are displayed as per the user policy. The cases where the original query contains the set operators a special function called merger is implemented in the database or at the proxy server and the data is displayed as per the user policy.

In another embodiment, the present disclosure provides a method for enforcing user policy to control access of sensitive data stored in a database. The method receives a query to retrieve data stored in the database using a receiving module. Further, the process parses the received query using a query parsing module. Furthermore, it generates a sensitive tree from metadata of the database using a sensitive tree generator module. The process analyzes sensitivity of the parsed query using sensitive tree by a query analyzing module and re-writs the received query using the sensitive tree by a query re-writing module. It Manages one or more preferences of one or more data subjects using a preference manager module, wherein the one or more preferences are set on the sensitive fields of the database and finally it enforces the one or more preferences related to the sensitive data using a preference enforcement module, wherein the preference enforcement module is configured to notify data subjects according to the preference document to protect sensitive data stored in database. The sensitive tree which is based on database metadata is used during query analysis and query re-writing. In cases the original query does not contain set operators the rewritten query is executed on the database and results are displayed as per the user policy. The cases where the original query contains the set operators a special function called merger is implemented in the database or at the proxy server and the data is displayed as per the user policy.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings:

FIG. 4 illustrates an exemplary embodiment for setting preferences on personal and sensitive fields of banking domain according to an embodiment of the present disclosure;

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
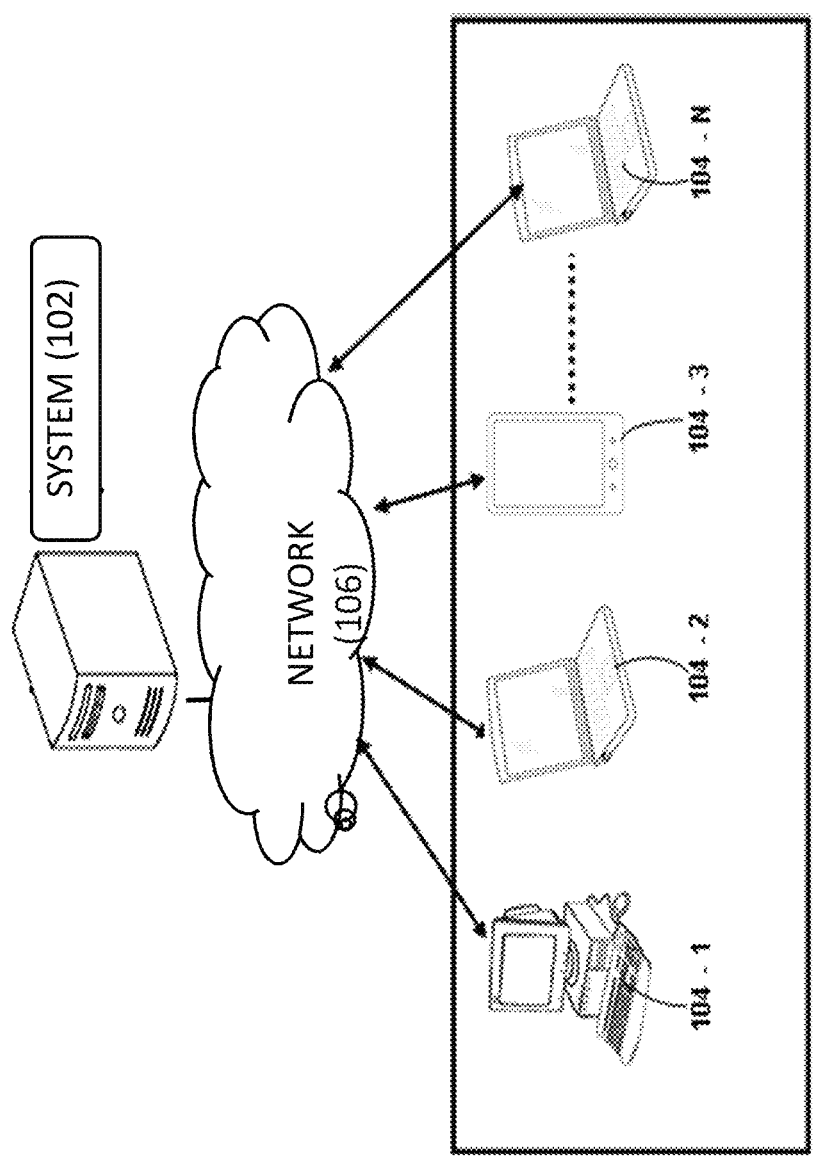
FIG. 1 illustrates a network implementation of a system for enforcing user policy according to an embodiment of the present disclosure.

Referring now to FIG. 1, a network implementation 100 of a system 102 for enforcing user policy to control access of sensitive data stored in a database.

Although the present subject matter is explained considering that the server 104 is implemented as a computing system, it may be understood that the server 104 may also be implemented as a variety of computing systems, such as a laptop computer, a desktop computer, a notebook, a workstation, a mainframe computer, a server, a network server, a tablet, a mobile phone, and the like. In one implementation, the server 104 may be implemented in a cloud-based environment.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
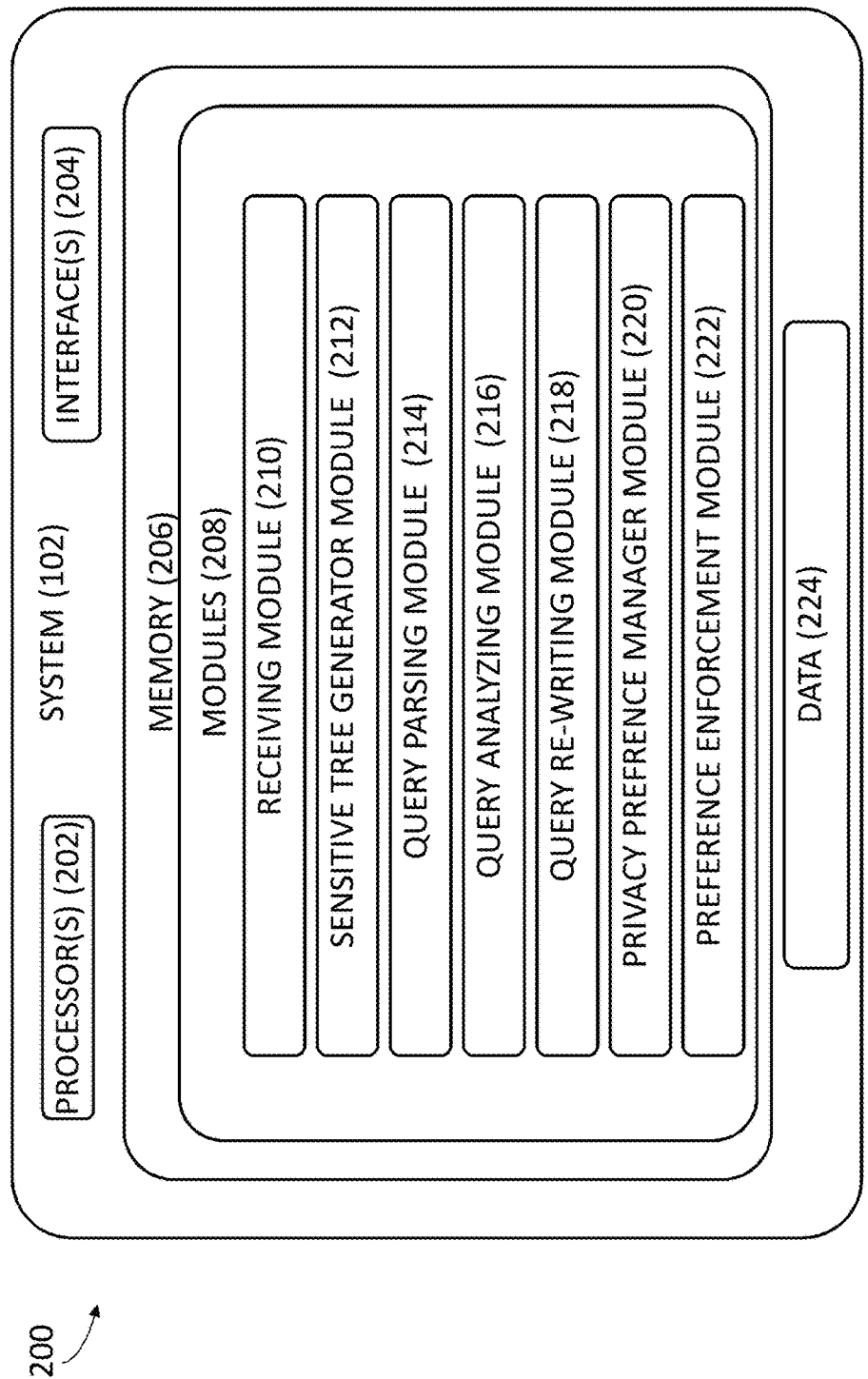
FIG. 2 illustrates the system enforcing user policy to control access of sensitive data stored in a database according to an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 224.

The modules 208 include routines, programs, objects, components, data structures, etc., which perform particular tasks or implement particular abstract data types. The modules 208 may include programs or coded instructions that supplement applications and functions of the system 102. The modules 208 described herein may be implemented as software modules that may be executed in the cloud-based computing environment of the system 102. Further, the system includes a receiving module 210, a sensitive tree generator module 212, a query parsing module 214, a query analyzing module 216, a query re-writing module 218, a privacy preference manager module 220 and a preference enforcement module 222.

Further, the data 224, amongst other things, serves as a repository for storing data processed, received, and generated by one or more of the modules of the system.

Figure 3:
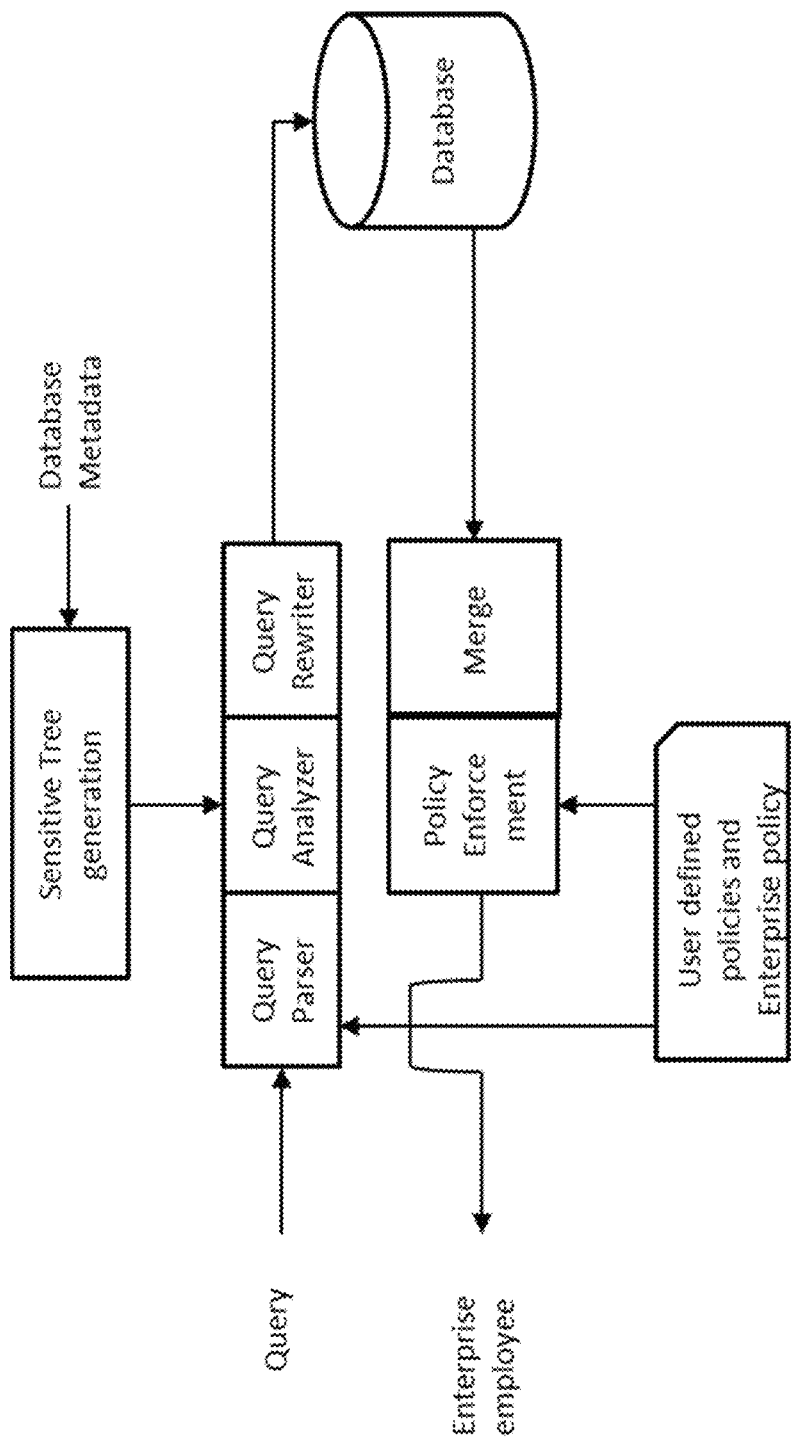
FIG. 3 illustrates an instance of generic solution for data privacy problem according to an embodiment of the present disclosure.

Referring to FIG. 3, a system for enforcing user policy to control access of sensitive data stored in a database. As shown in FIG. 3 a user policy and/or enterprise policy is predefined and mapped to the column of the database.

In the preferred embodiment, the system 100 helps the end-users in writing queries and executing them against database. After writing query, the end-user specifies the purposes behind executing a query and enters additional information in the remark section. When a query is fired as a first step, it is parsed using a SQL parser where all the columns, tables and schema present in a query are identified and returned in a structured form.

In the preferred embodiment, the receiving module 210 is configured to receive a query from a user, the received query is run through a query parsing module 214 to parse, and the result of the query parsing module is sent to a query analyzing module 216 to analyze the sensitivity of the query in order to determine presence of one sensitive column in the database.

In the preferred embodiment, the privacy preference manager module 220 is configured to manage the preferences of data subjects. These preferences are access preferences and set on the sensitive fields. The privacy preference manager module 220 allows users to manage preferences for their personal and sensitive fields.

Figure 4:
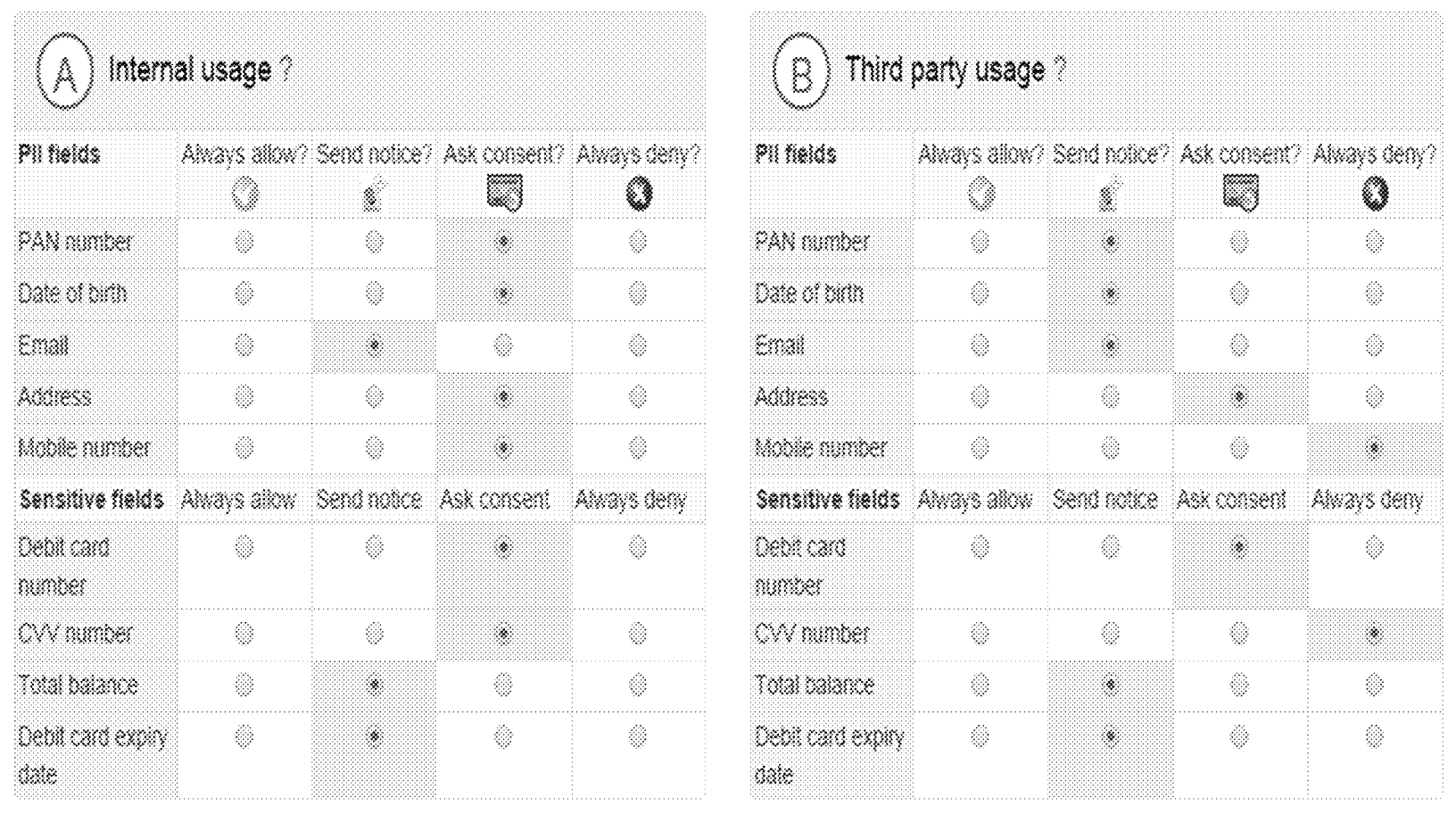

In one aspect four types of preferences may be supported by the system. 1) Always allow 2) Notice 3) Consent and 4) Always deny. In another embodiment these preferences may be extended to include time and date to suit user's busy and idle hours. In an example as shown in FIG. 4 Preferences for personal and sensitive fields of banking domain are shown. It would be appreciated that the system may also support other preferences which are not defined herein.

The system disclosed herein comprises a sensitive tree generator module 212. The sensitive tree generator module 212 is configured to generate a tree from the metadata of the database. The sensitive tree generator module 212 takes privacy preferences as input to determine the sensitivity of fields which will be subsequently used in marking (with sensitivity) tree nodes. In an aspect once the fields of preference document are mapped the sensitive tree generator module 212 fetches meta-data information from the database and generates a tree.

In an aspect of the subject matter disclosed herein user preferences along with the details of sensitive field may be exported in XML or JSON document called user preference document. The interface maps the sensitive fields of the preference document with columns of database. As shown in the FIG. 4 referenced above PAN Card, Date of Birth, Email, Address and Mobile number fields are mapped to columns of customer table.

Figure 5:
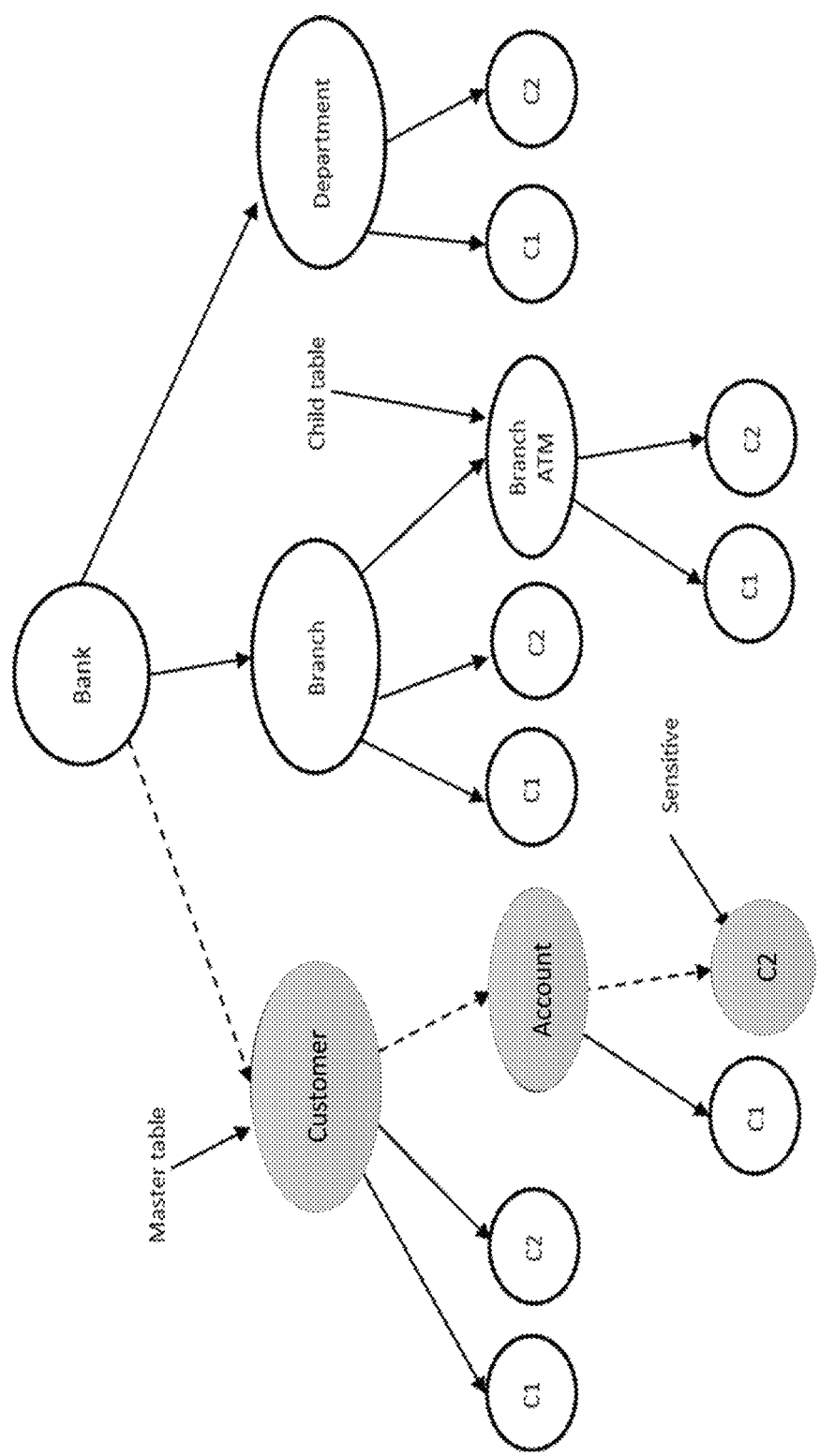
FIG. 5 illustrates an exemplary sensitive tree for database according to an embodiment of the present disclosure.

In one embodiment referring to FIG. 5 the generated tree is organized as follow. At root node is database schema or catalog (equivalent to schema). A level below the root node has master tables. Each master table node has columns as child nodes and its child table node. Table which refers to master table in its foreign key column is identified as child table. Table is considered as sensitive if one of its columns is marked as sensitive otherwise it is non sensitive. The nodes in a tree corresponding to column nodes of tables are marked using preference document. Marking is done to distinguish sensitive nodes from non-sensitive. In one aspect if a branch of tree contains at least one sensitive node then entire branch is marked as sensitive. Based on given tree structure, the classification of a query as sensitive or non-sensitive reduces to identifying a branch or a set of branches to which it belong. In another aspect if a query is mapped to one of sensitive branches then a query is sensitive.

The sensitive tree is generated using database metadata, which is used during query analysis and re-writing. Using the returned structured form, the sensitivity of a query is determined by mapping it to a tree structure. In one embodiment, if a query is mapped to one or more sensitive branches of a database tree, it is marked as sensitive; otherwise it is marked as a non-sensitive and executed against the database without further processing. If the query is marked sensitive then the query analyzing module 216 outputs sensitive branches for supplied query.

According to the system 102 disclosed herein the query re-writing module 218 is configured to rewrite the query. The query re-writing module 218 re-writes the query and the rewritten query is sent to the database. In cases the original query does not contain any set operator the rewritten query is executed on the database and results are displayed as per the user policies. The cases where the original query comprises query with set operators a special function called merger is implemented in the database or at the proxy server and the data is displayed as per the users' policies.

Merger function processes the result of a query if it contains set operators. Typically, almost all database vendors support set operations like union, union all, intersection, and set difference. The query with set operators needs to be processed differently as compared to those which do not contain set operators. The query re-writing module changes the semantics of set operations and therefore, the result of such queries require special processing.

In the preferred embodiment, for any database the order of fetching information from a table is predetermined while executing query. The database may use order mentioned in a query to fetch information from the respective tables and it is fixed for the database. The merger function intercepts the query fired against the database. It extracts operations specified on the query such as sorting of records based on specific column and it extracts the set operator of the query. Further, the merger function intercepts the result of the query. It removes the data subject identifier column from the result of the query. It creates one or more buckets for records excluding data subject identifier column based on the equality constraint. Further, it processes the records as per one or more set operations specified in the query and extracts one or more set operations. Finally, it appends the data subject identifier column to the result.

Figure 6:
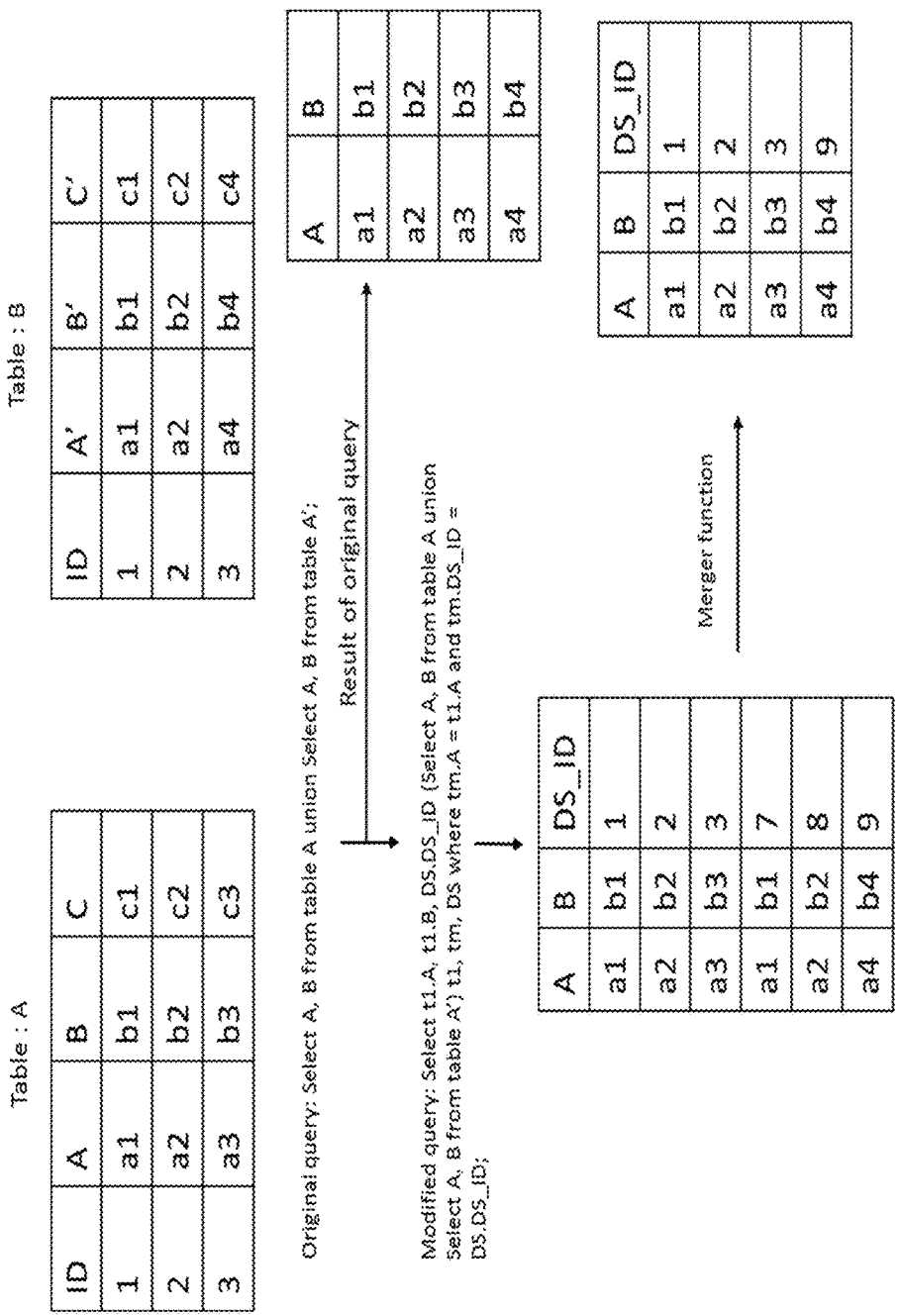
FIG. 6 illustrates an example of three outputs one each for original query, modified query and merger function according to an embodiment of the present disclosure.

Referring FIG. 6, as an example, wherein it comprises three outputs one each for an original query, a modified query and one with merger function. The original query contains set operation "union" and it fetches data from two tables viz. table A and table B. Results from both tables have first two records common and therefore, the output of the execution of this query has four records instead of six. If at least one of the columns have fetched sensitive data, the query has to be re-written to fetch data from the tables.

Further, if table 'tm' is a linking table between the table containing data subject information DS and tables A and B then the re-written query using sensitive tree is as shown in the FIG. 6. The result of this query contains six records as addition of data subject information creates a unique row in the output of the query. The application of merger function reduces the size of data records to the size of result of original query.

In another embodiment, the merger function takes four parameters. First parameter is the result RS of modified query. This parameter is both 'in' and 'out' parameter. Remaining three parameters are 'in' parameters. Second parameter is DB_Table_Order which captures the order in which database fetches information from the tables. Third parameter is set operation. The logic of merger function changes based on the set operation specified in the query. Fourth parameter is pending ops_list. It is the list of operations collected while extracting operations specified on the query.

Function Merger {[IN|OUT] RS, [IN] DB_Table_Order, [IN] Set_Op, [IN] Pending_ops_list}

Figure 7:
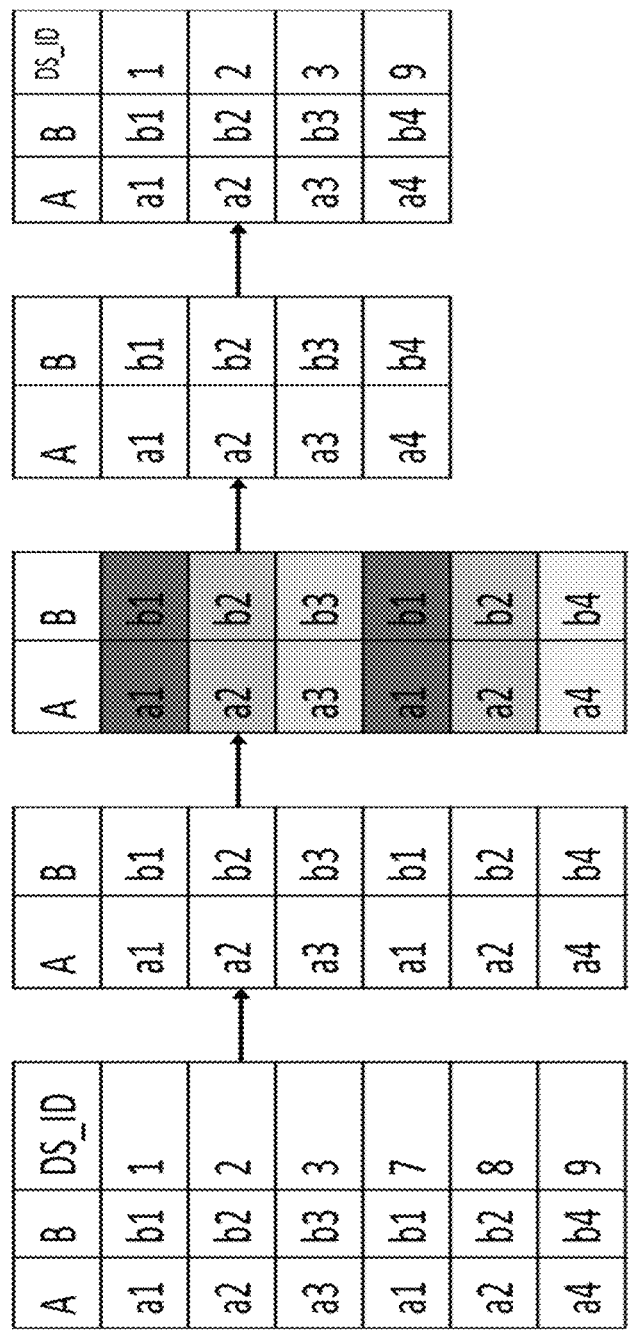
FIG. 7 illustrates an exemplary of merger function for query with set operators according to an embodiment of the present disclosure.

Referring FIG. 7, as an example, wherein it illustrates that the merger function processes result RS as per the supplied set operation. If the set operation is union then it creates buckets for the records contained in the RS excluding data subject information. From each bucket, the merger function picks the record as per the order mentioned in DB_Table_Order and discard remaining records. Finally, it appends all the records fetched from each bucket and put them in the result RS. As a first step, the merger function removes data subject identifier column. In the second step, the merger function creates buckets based on the equality constraints. In the third step, the merger function fetches single record from each bucket based on the DB_Table_Order parameter and in the last and fourth step the merger function appends data subject identifier information to the results RS.

In yet another embodiment, a query may contain the query with set operators. If a query is fired against the database and get result R1 then modified query obtained in the procedure mentioned in this disclosure should also get the result R1. Transformed query without set operations may give the same output as the original query. However, if query has set operations then modified query obtained using above mentioned procedure may produce different output then original query. This is due to addition of extra information about the data subjects in the result through query modification leads to different calculations of set operations by the database system. This problem is resolved using a special function called merger. It can be implemented in the database itself or in the proxy server sitting between database and an employee viewing the information. Merger function merges all the data subjects of the result into a single cell and hence all the cells will have same content in the data subject column. Therefore, while executing the queries involving set operations, data subject column will not affect their semantics and become transparent to them.

The system disclosed herein further comprises a preference enforcement module 220 configured such that once records of the data subjects in the result after execution of modified query are retrieved, this information can be used to notify data subjects according to Preference document if the sensitive data pertaining to them are viewed by employees for specific purpose. Finally the system may also produce privacy reports based on logs generated by the system. Wherein Privacy report is a kind of report to data subject which states when particular field was accessed, for what purpose and the frequency of access of that field, comparison with average access of that field for all data subjects, etc.

Figure 8:
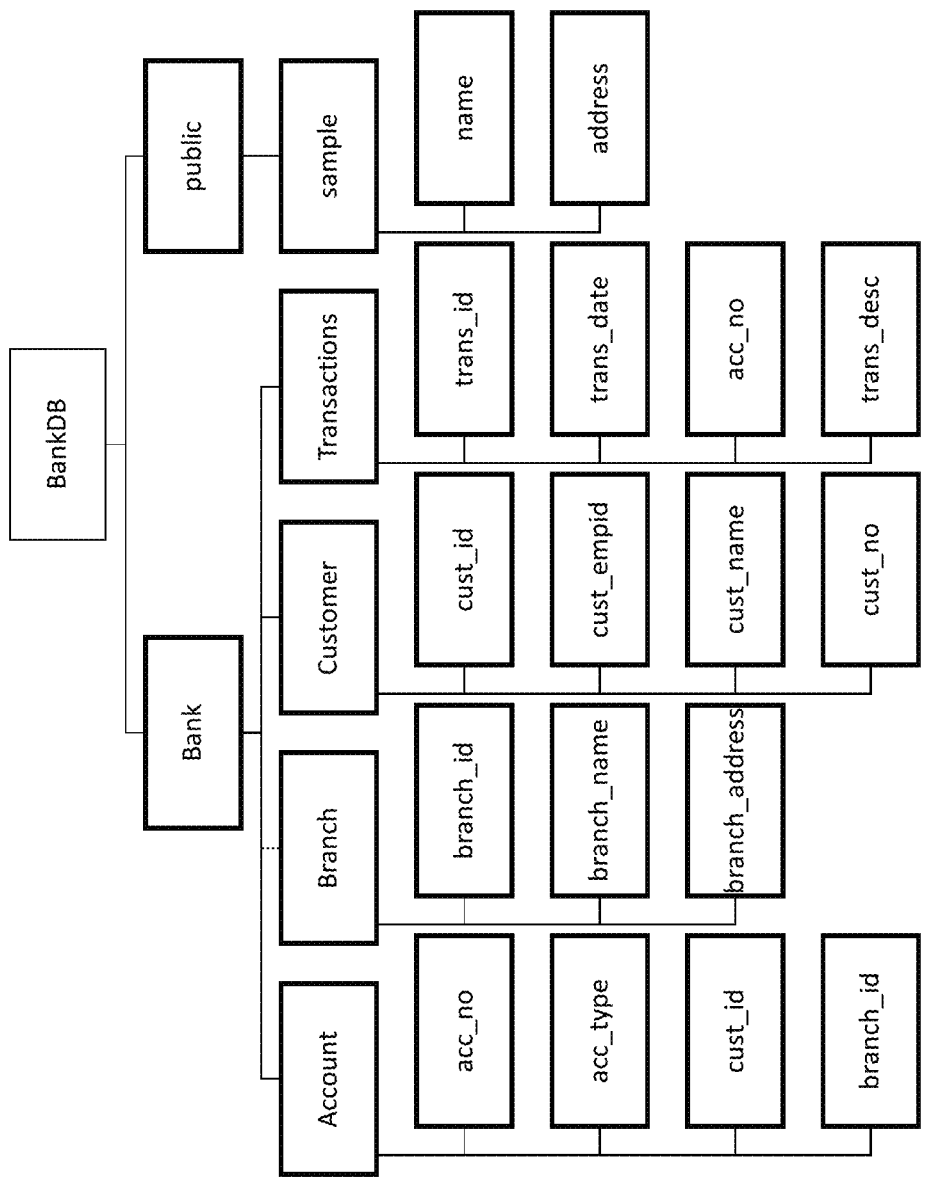
FIG. 8 illustrates an example of bank database hierarchy according to an embodiment of the present disclosure.

Referring FIG. 8, as an example, if a query refers to an account table and not customer table (Master table) then with starting node of "C2", a sensitive branch is traversed in upward direction. If the query moves up in the branch, it encounters account table node which is already part of query (since one of its columns is being fetched). Further, if it move further up in the branch, it may get node for the customer table. The query will be re-written at this point by adding one extra table (customer) in the query and joining account table with customer table on common column. Thus, the query re-writing procedure is automated and link to tree traversal. It would be appreciated herein that the query is traversing only sensitive branches not all the branches of tree. This will substantially improve the performance of query re-writing module. In the absence of sensitive tree, the user may have to explore all the paths in the database to get to Master table which will quite inefficient.

Figure 9:
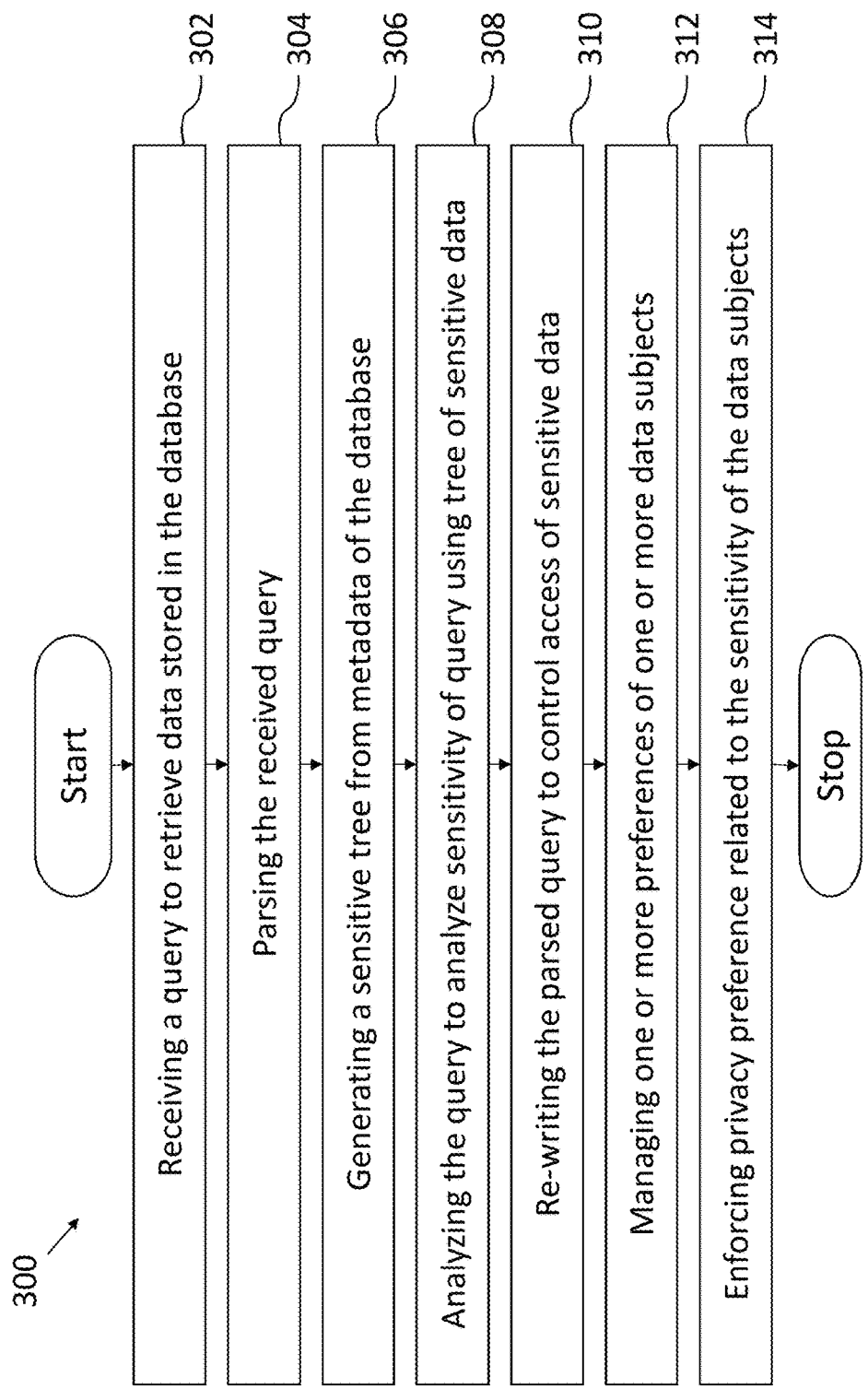
FIG. 9 illustrates a method for enforcing user policy to control access of sensitive data stored in a database according to an embodiment of the present disclosure.

Referring FIG. 9, wherein it illustrates a method 300 for enforcing user policy to protect sensitive data stored in a database.

At the step 302, where the process receives a query to retrieve data stored in the database, wherein the query may include query with set operators.

At the step 304, where the process parses the query using a query parsing module.

At the step 306, where the process generates a sensitive tree from metadata of the database using a sensitive tree generator module.

In an example, when an employee is accessing customer's data in a production environment, it is difficult to find out whose records the employee is accessing. He can simply fetch account number from account table by executing query "Select acc_no from Account". The challenge here is to quickly find out owners (data subjects) of account numbers being fetched. To identify data subjects, the query needs to be re-written so that additional information of data subjects in the result is returned.

At the step 308, where the process analyzes sensitivity of the parsed query using sensitive tree which is based on database metadata.

At the step 310, the process re-writes the received query using the sensitive tree which is based on database metadata.

In one aspect, where a query contains the sensitive master table and column identifying the data subjects of that master table using query analyzing module 216, the re-writing module 218 may not perform a re-writing. In another aspect where a query does not contain the column pertaining to data subjects but it references master table containing information about data subjects. The actions may be performed. The query is parsed and is then mapped to sensitive tree structure. If a query is sensitive then it will mapped to one of sensitive branches of the tree. Since the query references master table pertaining to data subjects, a part of sensitive branch (of length 1) may match to the query structure. Re-writing query now amounts to getting relevant column from the tree and adding it to existing query.

In yet another aspect where a query does not contain the column pertaining to data subjects and it does not refer to master table then re-writing of a query requires tree traversal in the upward direction. If a query is sensitive then it will map to sensitive branches of tree. For each sensitive branch, which is mapped to query, is traversed in the upward direction. The starting node of traversal is the column node of the branch which is referred by the sensitive query. As traversal along the sensitive branches proceeds, the sensitive query is re-written using the common columns reference between child table node and parent node.

At the step 312, where the process manages one or more preferences of the one or more data subjects using a preference manager module. The one or more preferences are set on the sensitive fields of the database.

At the last step 314, where the process enforces one or more preferences related to the sensitive data using a preference enforcement module. The preference enforcing module is configured to notify data subjects according to the preference document to protect sensitive data stored in database.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A system for enforcing user policy to control access of sensitive data stored in a database, wherein the system comprising:
   a processor;
   a memory coupled to the processor, wherein the processor is capable of executing a plurality of modules stored in the memory;
   a receiving module configured to receive a query to retrieve data stored in the database;
   a query parsing module configured to parse the received query;
   a sensitive tree generator module configured to generate a sensitive tree from metadata of the database;
   a query analyzing module configured to analyze the sensitivity of the parsed query using the sensitive tree;
   a preference manager module configured to manage the preferences of one or more data subjects, wherein the one or more data subjects are present in the database, wherein the preferences are set on sensitive fields of the database;
   a query re-writing module configured to re-write the received query using the sensitive tree and send the rewritten query to the database, and
   a preference enforcement module configured to notify data subjects according to the preferences to protect sensitive data stored in database.

2. The system claimed in claim 1, wherein the sensitive tree generator module takes privacy preferences as input to determine the sensitivity of fields of the database which may be subsequently used in marking tree nodes.

3. The system claimed in claim 1, wherein the user policy is mapped to one or more columns of the database.

4. The system claimed in claim 1, wherein the sensitive tree is generated using database metadata.

5. The system claimed in claim 1, wherein the system is configured to have merger function to resolve the query with set operators.

6. A method for enforcing user policy to control access of sensitive data stored in a database, wherein the method comprising one or more steps of:
   receiving a query to retrieve data stored in the database using a receiving module;
   parsing the received query using a query parsing module;
   generating a sensitive tree from metadata of the database using a sensitive tree generator module;
   analyzing sensitivity of the parsed query using sensitive tree by a query analyzing module;
   re-writing the received query using the sensitive tree by are-writing module;
   managing one or more preferences of one or more data subjects using a preference manager module, wherein the one or more preferences are set on the sensitive fields of the database; and
   enforcing one or more preferences related to the sensitive data using a preference enforcement module, wherein the preference enforcement module is configured to notify data subjects according to the preference document to protect sensitive data stored in database.

7. The method claimed in claim 6, wherein the query comprises one or more sub-queries.

8. The method claimed in claim 6, wherein the one or more preferences are access preferences.

9. The method claimed in claim 6, wherein the preference policy is mapped to one or more columns of the database.

10. The method claimed in claim 6, wherein the sensitive tree is generated using database metadata.

11. The method claimed in claim 6, wherein the merger function to resolve the query with set operators.

12. A non-transitory computer readable medium storing instructions for enforcing user policy to control access of sensitive data stored in a database, the instructions comprising:
- receiving a query to retrieve data stored in the database using a receiving module;
- parsing the received query using a query parsing module;
- generating a sensitive tree from metadata of the database using a sensitive tree generator module;
- analyzing sensitivity of the parsed query using sensitive tree by a query analyzing module;
- re-writing the received query using the sensitive tree by are-writing module;
- managing one or more preferences of one or more data subjects using a preference manager module, wherein the one or more preferences are set on the sensitive fields of the database; and
- enforcing one or more preferences related to the sensitive data using a preference enforcement module, wherein the preference enforcement module is configured to notify data subjects according to the preference document to protect sensitive data stored in database.

* * * * *